United States Patent
Barrett et al.

(10) Patent No.: US 6,549,933 B1
(45) Date of Patent: *Apr. 15, 2003

(54) MANAGING, ACCESSING, AND RETRIEVING NETWORKED INFORMATION USING PHYSICAL OBJECTS ASSOCIATED WITH THE NETWORKED INFORMATION

(75) Inventors: Robert Carl Barrett, Sunnyvale, CA (US); Paul P. Maglio, Santa Cruz, CA (US); Edwin J. Selker, Palo Alto, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,436

(22) Filed: Aug. 4, 1998

(51) Int. Cl.[7] .............................................. G06F 13/14
(52) U.S. Cl. ...................................... 709/203; 709/218
(58) Field of Search ......................... 707/10; 709/203, 709/218, 246; 710/7

(56) References Cited

U.S. PATENT DOCUMENTS

| | | | | |
|---|---|---|---|---|
| 5,619,640 A | * | 4/1997 | Tezuka et al. | 345/762 |
| 5,804,803 A | * | 9/1998 | Cragun et al. | 235/375 |
| 5,894,585 A | * | 4/1999 | Inoue et al. | 710/7 |
| 6,128,668 A | * | 10/2000 | Barber et al. | 709/246 |
| 6,247,012 B1 | * | 6/2001 | Kitamura et al. | 707/10 |
| 6,269,369 B1 | * | 7/2001 | Robertson | 707/10 |
| 6,360,222 B1 | * | 3/2002 | Quinn | 707/100 |

OTHER PUBLICATIONS

1. Adler, S. et al., *A Proposal for XSL*, Microsoft Corporation, 1997. Available as: http://www.w3.org/TR/NOTE-XSL.html.
2. Bray, T., Paoli, J., and Sperberg–McQueen, C.M., *Extensible Markup Language (XML) 1.0*, W3C Recommendation, World Wide Web Consortium, 1998. Available as http://www.w3.org/TR/1998/REC-xml-19980210.html.
3. Dieberger, A., *A city metaphor to support navigation in complex information spaces*, in Hirtle, S.C., and Frank, A. U. (Eds.), *Spatial information theory: A theoretical basis for GIS*, COSIT '97, Springer–Verlag, Berlin, 1997.
4. Fielding, R., Gettys, J., Mogul, J. C., Frystyk, H., Masinter, L., Leach, P., and Berners–Lee, T., *Hypertext Transfer Protocol—HTTP/1.1*, World Wide Web Consortium, 1998. Available as http://www.w3.org/Protocols/HTTP/1.1/draft-ietf-http-v11-spec-rev-0.3.txt.
5. Freier, A. O., Karlton, P., and Kocher, P. C., *The SSL Protocol*, Netscape Corporation, 1996. Available at http://home.netscape.com/eng/ssl3/draft302.txt.
6. Leach, P. J., and Naik, D. C., *A Common Internet File System (CIFS/1.0) Protocol*, Microsoft Corporation, 1997. Available as ftp://ietf.org/internnet-drafts/draft-leach-cifs-v1-spec-01.txt.

(List continued on next page.)

Primary Examiner—N. Le
Assistant Examiner—Walter Benson
(74) Attorney, Agent, or Firm—Gates & Cooper LLP (57) ABSTRACT

A method, apparatus, and article of manufacture for managing information through the use of physical objects. An Informative Thing that is a physical object stores a pointer thereon, and the pointer is used to retrieve information associated with the Informative Thing from a network-based system. The Informative Thing provides a user interface that gives the impression of storing information on the physical object, when, in reality, the system stores the information in the network. By hiding the details of information retrieval, information management is greatly simplified. By linking the physical and virtual worlds, users' highly-developed ability to work in the real world is leveraged.

80 Claims, 3 Drawing Sheets

OTHER PUBLICATIONS

7. Maglio, P.P. and Barrett, R., *On the trail of information searchers*, Proceedings of the Nineteenth Annual Conference of the Cognitive Science Society (Stanford University, Palo Alto, CA), LEA, Mahwah, NJ, 1997, pp. 466–471.

8. Maglio, P.P. and Matlock T., *Metaphors we surf the web by*, Workshop on Personalized and Social Navigation in Information Space, Stockholm, Sweden, 1998.

9. Mander, R., Salomon, G., and Wong, Y.Y., *A "pile" metaphor for supporting casual organization of information*, Proceedings of the ACM Conference on Human Factors in Computing Systems, CHI '92, ACM Press, New York, 1992.

10. Selker, T. and Allison, J., *Room with a view*, Proceedings of Computer Supported Cooperative Work '96, Boston, MA, 1996.

11. Vicente, K. J. and Williges, R. C., *Accommodating individual differences in searching a hierarchical file system*, International Jouranl of Man–Machine Studies, 29, pp. 647–668, 1988.

12. Waterworth, J. A., *Personal spaces: 3D spatial worlds for information exploration, organization and communication*, in Earnshaw, R., and J. Vince (Eds.), *The Internet in 3D: Information, image, and interaction*, Academic Press, San Diego, 1997.

13. Wellner, P., Mackay, W., and Gold, R., *Computer–augmented environments: Back to the real world*, Special issue of Communications of the ACM, 6, 1993.

14. Zimmerman, T., *Personal Area Networks: Near–field intrabody communication*, IBM Systems Journal, vol. 35, Nos. 3&4, 1996, pp. 609–617.

15. Ishii, H., and Ullmer, B., *Tangible Bits: Towards Seamless Interfaces between People, Bits, and Atoms*, ACM Computer–Human Interaction SIGCHI '97, Atlanta, GA, pp. 234–241, 1997.

\* cited by examiner

MANAGING, ACCESSING, AND RETRIEVING NETWORKED INFORMATION USING PHYSICAL OBJECTS ASSOCIATED WITH THE NETWORKED INFORMATION

BACKGROUND OF THE INVENTION

1. Field of the Invention

This invention relates in general to information management, and more particularly, to managing networked information using physical objects.

2. Description of Related Art

To simply find a computer file, one often searches through several directories, through several hard disks, or even through data on several networked computers. Because of the sheer size of one's personal information space, keeping track of where things are located has become a chore. Modern human-computer interfaces provide many mechanisms that attempt to help, such as navigating a hierarchical file structure or following paths through the World Wide Web. Because people naturally think of such information spaces in physical terms [see, e.g., references #4, #8, #11 at the end of this specification], user interface designers often try to create virtual worlds that are similar to the physical world [see, e.g., references #3, 11]. Nevertheless, the sheer volume of information available today inevitably leads to problems in managing it [see, reference #9].

Thus, there is a need in the art for new approaches to information management, especially mechanisms that can be used to move information from place to place. More specifically, there is a need in the art for approaches that simplify the steps a user must go through to copy a file from one physical location to another on a ftp site or on the web, as well as the time involved to perform those steps.

SUMMARY OF THE INVENTION

To minimize the limitations in the prior art described above, and to minimize other limitations that will become apparent upon reading and understanding the present specification, the present invention discloses a method, apparatus, and article of manufacture for managing information through the use of physical objects. An Informative Thing that is a physical object stores a pointer to the desired information. Upon interfacing to a network-based system, the pointer is retrieved and then used to retrieve the desired information associated with the Informative Thing from a network-based system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

We proposed a new approach to information management in which users interact with ordinary physical objects. A simple floppy disk is our canonical example of a physical object that holds information and that can be used to move information from place to place. We believe that in many cases, the floppy disk is exactly the right mechanism for moving information around. It simplifies the steps the user must go through to copy a file from one physical location to another; for instance, when one of us has updates for the paper we are writing together, we simply put the file on a floppy and walk it over to the other's office. Alternatives to this "sneaker net" method include emailing the file, putting the file on a shared disk, and posting the file on an ftp site or on the web. Each of these mechanisms, however, involves a series of decisions (e.g., where to put the file on the network so that the other can access it, what to name it, and so on) and a series of time-consuming steps (e.g., ftping the file or detaching it from an email message) that are largely irrelevant when using the floppy disk. In short, when using a physical object to transfer information, there is no question where the information is, what it is called, or how it can be obtained; it is contained by the physical object and can be obtained through the physical object.

One problem with floppy disks, of course, is that storage capacity is severely limited. But in a networked world, floppy disks need not actually contain the information that is presumably on them. They need only contain pointers to the information. More precisely, we propose a method for labeling physical objects and for associating those labels with network information sources. This approach, called Informative Things, relieves the user of many burdensome tasks involved in naming, finding, saving, and managing networked information by providing a simple, physical user interface to the information.

One example is the floppy disk that can hold an unlimited amount of data, such as the installation for Netscape Communicator. Another is the Palm Pilot that can hold all files or email to be taken home at night. Each physical object, such as the floppy or the Palm Pilot, has a unique identifier, and when information is copied to the object, it is in fact attached to the object's identifier in a central database. When the floppy is placed in the drive or when the Palm Pilot is 'hot synced', the data attached to object's identifier is found on the network and transferred to the local system. The key point is that the mechanism is hidden from the user, thus simplifying the user's job.

For the sake of usability, our method limits the flexibility of managing networked information. For example, in conventional networked computing, a file can be modified from anywhere. But in our system, the user who holds the physical object is the only one who can modify the information attached to that object. Other users cannot change what is attached to the object.

Of course, this restriction makes sense when talking about real floppy disks, which users must physically possess to modify. Although our 'virtual floppy disk' need not restrict who has modification rights for the attached data, we choose to limit this control to emulate the physical world. We believe the power of our approach lies in judiciously choosing constraints to maximize both usability and flexibility.

In creating user interfaces, the temptation is always to widen the scope of applicability, giving the user ever more abilities. In this case, by taking operations away from the user (such as the ability to change the file pointed to by an object), we have eliminated issues of giving permissions and deciding where to put files.

Two basic mechanisms underlie our approach: physical objects can be associated with a unique identifier (ID), and arbitrary information can also be attached to an ID. The identifier serves as the key in a lookup table associating a physical thing with information. Of course, the general idea is not new. For example, electronic hotel keys and corporate identification badges are physical objects with IDs, but they are specialized for their purpose and do not allow arbitrary information to be attached to them. Smart cards and personal area networks [see, e.g., reference #14] are used for transmitting unique IDs, but these IDs represent a person's identity rather than an object's identity. Like Informative Things, augmented reality systems attach data to physical objects or to physical locations [see, e.g., reference #10], but their purpose is to enhance the user's perception of the environment rather than to manage information. Our innovation is to bring the ideas of object IDs and information attachment together as an information interface.

In what follows, we first present details of the hardware environment and our Informative Things implementation. We then elaborate a series of user scenarios that are simplified or facilitated by Informative Things. Next, we discuss the basic under-level issues our approach addresses. Finally, we discuss open questions and future work.

Hardware Environment

Figure 1:
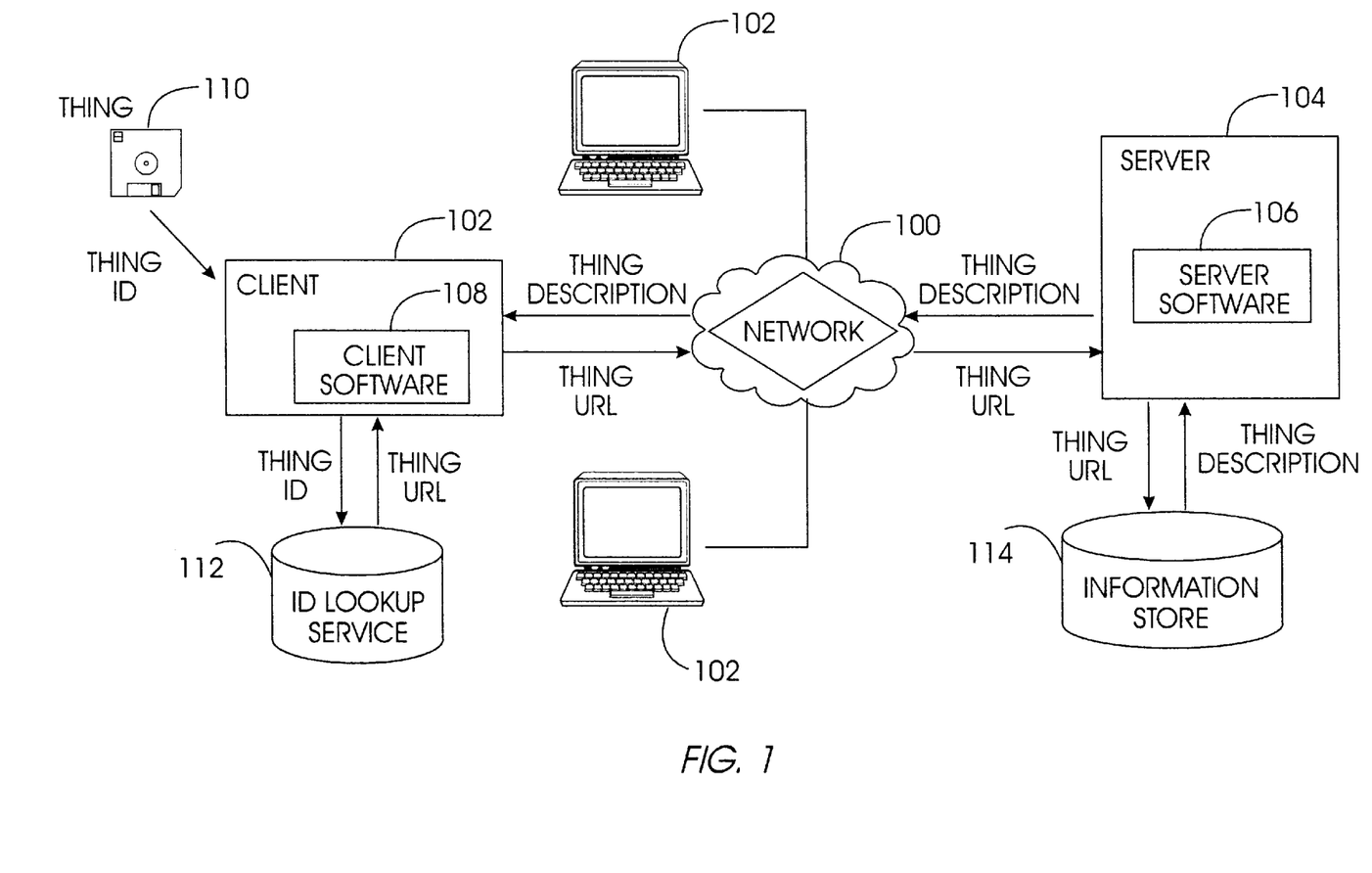
FIG. 1 is a block diagram of an exemplary hardware environment of the preferred embodiment of the present invention, and more particularly, illustrates a typical distributed computer system.

FIG. 1 is a block diagram of an exemplary hardware environment of the preferred embodiment of the present invention, and more particularly, illustrates a typical distributed computer system, wherein a network 100 connects one or more clients 102 to one or more servers 104. The network 100 preferably comprises the Internet, although it could also comprise intranets, extranets, LANs, PANs, WANs, etc. A typical combination of resources may include clients 102 that are personal computers or workstations, and servers 104 that are personal computers, workstations, minicomputers, and/or mainframes.

Each of the computers generally include, inter alia, a processor, random access memory (RAM), data storage devices, data communications devices, display devices, input devices, etc. Of course, those skilled in the art will recognize that any combination of the above components, or any number of different components, peripherals, and other devices, may be used in the present invention.

In the present invention, the server 104 executes a server program 106 and the client 102 executes a client program 108. The client program 108 determines an ID of an Informative Thing 110, which it then uses to find the location of the information attached to the Thing 110 via an ID lookup service 112. The client program 108 relies on the server program 106 to retrieve the information associated with the ID from an information store 114.

Generally, the components of the present invention comprise instructions and/or data which, when read, executed, and/or interpreted by the client 102 and/or server 104, causes the client 102 and/or server 104 to perform the steps necessary to implement and/or use the present invention. Often, these instructions and/or data are embodied in and/or readable from a device, carrier, or media, such as a memory, data storage device, or other device capable of being coupled to the computer.

Thus, the present invention may be implemented as a method, apparatus, or article of manufacture using standard programming and/or engineering techniques to produce software, firmware, hardware, or any combination thereof. The term "article of manufacture" as used herein is intended to encompass instructions and/or data accessible from any device, carrier, or media.

Those skilled in the art will recognize that the exemplary environment illustrated in FIG. 1 is not intented to limit the present invention. Indeed, those skilled in the art will recognize that other alternative hardware environments may be used without departing from the scope of the present invention.

Operation of Informative Things

In a preferred embodiment, a simple web-based system embodying the Informative Things 110 concept is implemented. As noted above in FIG. 1, the system is comprised of a client 102, a server 104, and an Informative Thing 110 that is a physical object. The client 102 provides the user interface, whereas the server 104 pro ides the information store 114. The client 102 determines the ID of the Thing 110, which it then uses to find the location of the information attached to the Thing 110 using the ID Lookup Service 112. The client 102 relies on a server 104 to retrieve the information associated with an ID from the information store 114.

In this section, we first present our method for determining the ID of a Thing 110, and we then discuss the methods used for accessing information attached to a Thing 110 and for attaching information to a Thing 110.

How to Read IDs

There are many methods for determining the ID of a Thing 110 and only a few will be discussed here. As mentioned, the simplest case is where the Thing 110 is a removable data storage device, such as a floppy disk, CD-ROM, magneto-optical disk, memory card, etc. In the example of a floppy disk, the ID is read from a hidden file that is automatically generated when the floppy disk is first accessed by the client 102. A combination of timestamp, machine ID, and random number is used to virtually guarantee uniqueness and prevent guessing. Alternatively, the volume label and serial number could be used. The advantage of the floppy disk is that in most cases no new hardware or configuration is needed to read the ID.

Other Informative Things 110 can be accessed with special hardware. The communication mechanisms can be roughly separated into two classes: Things 110 that actively broadcast their IDs to interested clients 102 and Things 110 having an ID that can be passively read by an interested client 102.

Active broadcasters include personal area network transmitters [see, e.g., reference #14] and infrared transmitters. These devices contain their own internal power source and broadcast their IDs periodically, to be picked up by any receivers within range. By operating with a low duty cycle, such devices can have battery lives of several years and can avoid interference with other similar devices in the same area. These devices can be read at-a-distance and therefore do not have to be "plugged in " and do not suffer from unreliable electrical contracts.

Passive IDs may comprise markings on a Thing 110 that can be read by the client 102. For example, barcodes can be printed on many objects and can then be scanned by a barcode reader. A more elaborate scheme for reading markings might involve a computer vision system. Alternatively, a hardware connection to the client 102, such as through serial or parallel ports, can be used to determine an ID.

How to Access Information

Once the client 102 has determined an ID for a Thing 110, it can find the information attached to that Thing 110. Our current system uses two levels of indirection between the ID and the actual information, as indicated in FIG. 1. A Thing ID is mapped to a Thing Universal Resource Locator (URL), which can then be used to find a Thing Description. A Thing Description contains a list of attachment URLs, which in turn point to the information that is associated with the Thing 110.

The mapping from Thing IDs to Thing URLs allows the management of information associated with a Thing 110 to be distributed. After reading a Thing ID, the client 102 contacts the ID Lookup Service 112 to determine the Thing URL using the Thing ID. This Lookup Service 112 could be located at the client 102 or a centralized well-known server 104, or it could be distributed (e.g., as the Domain Name Service system). In either case, the client 102 receives a Thing URL that can be used to find a Thing Description. This ID-to-URL mapping allows the Thing Descriptions to be stored in a distributed manner rather than all on one server 104.

In one embodiment, a Thing Description is an XML document [see, e.g., reference #2]. Below is a sample Thing Description, which contains information about the Thing 110 as well as URLs through which the client 102 can find the associated information.

```
<THING>
   <RANGE TYPE=INTERNET/>
   <NAME>My Thing</NAME>
   <FOLDER>
      <NAME>Today's News</NAME>
      <DOCUMENT>
         <NAME>Headlines</NAME>
         <URL>http://www.news.com/headlines</URL>
      </DOCUMENT>
      <DOCUMENT>
         <NAME>Sports</NAME>
         <URL>http://www.sports.com/</URL>
      </DOCUMENT>
   </FOLDER>
   <FOLDER>
      <NAME>Briefcase</NAME>
      <DOCUMENT>
         <NAME>ThingPaper.doc</NAME>
         <URL>http://thing.ibm.com/barrett/
             ThingPaper.doc</URL>
      </DOCUMENT>
   </FOLDER>
</THING>
```

Figure 2:
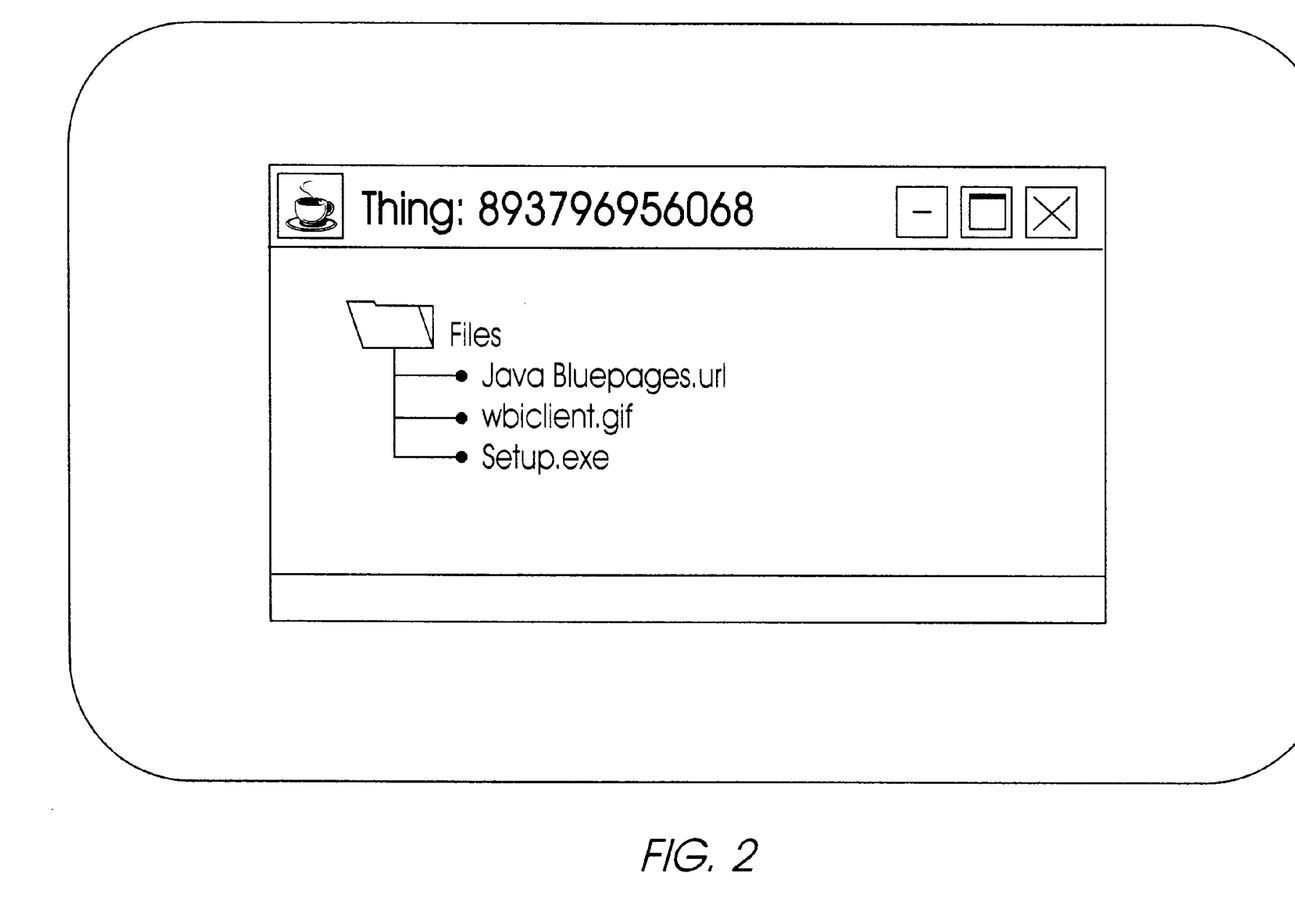
FIG. 2 illustrates a graphical user interface rendering of the information associated with an Informative Thing.

This method of encoding the contents of a Thing 110 allows the client 102 to choose its own rendering of the information, either through a web browser (using XSL [see, e.g., reference #1] to convert the XML to HTML), or through a graphical user interface widget, as indicated in FIG. 2, which shows a file list of information associated with a specified Thing ID. In another implementation, the client 102 might export the information associated with the Thing 110 as a CIFS disk [see, e.g., reference #6], making it available to the user's normal file system.

Once the client 102 has obtained the attachment URLs from the Thing Description, it can retrieve the information associated with the Thing 110 by accessing those URLs. The information can be presented to user through a web interface or through a file system interface, as indicated in FIG. 2.

How to Store Information

The mechanism for attaching or associating information to a Thing 110 is similar. First, the information to be attached to the Thing 110 must be made available on a server 104. In one embodiment, a Thing 110 can be made available in a particular range, either Local, Intranet, or Internet. If the range is Local, the information to be attached to the Thing 110 is put on a local machine, using "file:///" URLs. If the range is Intranet, the information is stored on a server 104 within the corporate firewall. If the range is Internet, the information is stored on a server 104 outside the firewall. This simplified access model provides the most basic permissions structure.

Once the attached information is stored, the client 102 uses the ID Lookup Service 112 to determine the Thing URL. If the Thing 110 is new to the system, its ID and associated URL must be stored on the ID Lookup Service 112. In any event, given the Thing URL, the client 102 can modify the Thing Description (XML document) by reading the original contents, making any changes, and then re-storing the modified contents using an HTTP "PUT" request [see, e.g., reference #4]. Alternatively, a CGI interface could be used for simple COPY, MOVE, RENAME, DELETE command to manage the contents of the Thing Description.

Security Issues

Maintaining strong security in a system such as this is difficult. A balance must be struck between security and usability. A number of attacks can be identified:

access to information attached to a Thing 110 without ever having been in possession of the Thing 110, access to attached information for a Thing 110 given previous possession of the Thing, and access to attached information for a Thing 110 by users who have inappropriately gained possession of the Thing 110.

In the first case, a user might either guess a Thing ID or eavesdrop on a network 100 conversation that communicates the Thing ID. Our current system uses 64-bit Thing IDs, making the likelihood of guessing a valid ID quite small. SSL communication [see, e.g., reference #5] with the ID Lookup Service 112 can effectively eliminate eavesdropping on the Thing IDs. But even if someone has not guessed an ID or found one by snooping, because the data attached to a Thing 110 is stored on the network 100 using normal URLs, what is to keep other users from casually accessing the information with a normal web browser? First, some of the information stored on a Thing 110 is generally available (for example, a pointer to the IBM Home Page). There is no need to protect these URLs. The issue comes for information that has been specifically exported to a server 104 for attachment to a Thing 110.

We would like to ensure that private information attached to a Thing 110 can only be accessed by the user who is in possession of that Thing 110. Our approach ha been to make the attachment URLs difficult to discover. This can be accomplished by the same means that make Thing IDs difficult to discover: (a) automatically produce complex URLs that are difficult to guess, and (b) use trustworthy clients 102 that do not reveal the URLs that are being accessed. The first step is quite straightforward, but the second might imply that traditional web browser should not be used for accessing the information, as they casually reveal the URLs that are being accessed. A further protective mechanism would be to restrict access to exported data by requiring the Thing ID as a password.

The second security issue is somewhat more complicated. If a Thing 110 were previously in the user's possession, that user could remember the Thing ID and use it later, even though the user is no longer in possession of the Thing 110. This would allow the user to manipulate the information attached to the Thing 110. To eliminate this kind of attack, the Thing 110 can actively broadcast an ID that varies with time, thus reducing the ID's vulnerability to a small time window. Alternatively, the client 102 may again be trusted to not reveal the IDs of Things 110 it handles. Of course, this protection can be defeated by programs that actively spy on the operation of trusted clients 102, for instance, by observing network 100 traffic.

The third security issue involves preventing access by users who have come into illicit possession of a Thing 110. Our basic system assumes that possession implies permission to access attached information. But in some instances, additional security may be needed. Passwords or certificates can be added to the protocol for accessing the ID Lookup Service 112 and for accessing the information attached to a Thing 110. This requirement creates the additional burden of maintaining passwords.

We have provided only a cursory look at some security aspects of Informative Things 110. Clearly, security in a dynamic distributed data environment is a complex issue, and will ultimately require more detailed consideration.

Scalability

To be useful on a large scale, Informative Things 110 must be able to handle a large volume of transactions without any bottlenecks. The only concentration point in our system is the ID Lookup Service 112. As mentioned, this Service 112 could be operated in a hierarchical manner, similar to DNS, which can obviously scale as required. The load will be higher, however, if secure time-dependent Thing IDs are used or if the communications are encrypted, as with SSL.

The rest of our system is naturally distributed: Thing URLs and the attached data are stored on several servers 104. There is no problem with high numbers of hits on particular Thing URLs because only the user who is in possession of the physical object is allowed to access the attached information.

Scenarios

The Informative Things 110 concept is broadly applicable, as it provides a general method for managing and transferring information. In this section, we describe several scenarios that illustrate some of this breadth.

The simplest example is the one we have been describing all along: two people sharing data in close physical proximity. The sender of the data takes a Thing 110 and "connects" it to his or her computer. "Connect " may mean inserting a floppy disk, placing a PalmPilot in its port, scanning a barcode, or some other operation. In the background, the client 102 reads the Thing ID, looks up the Thing URL and Thing Description, and displays an icon representing the Thing 110 on the screen. The user then copies the files to the icon, disconnects the Thing 110, and hands it to a colleague. When the user copies the file, the system actually transfers the file to an appropriate server 104 and updates the Thing Description to reflect that this file is now attached to the Thing 110. When the receiving party connects the Thing 110 to his or her computer, the attached data is now available for use. The transfer is simple, fast (assuming a fast network), and not limited by floppy disk capacity.

Another scenario involves a user who works with two different computers. Keeping files synchronized is always a chore. But using Informative Things 110 and a personal area network (PAN) makes it simple. The user keeps a PAN card in his or her wallet. When the user sits at the keyboard of one computer, the PAN receiver picks up the PAN card's ID and displays an icon representing the card and its attached data. The user can simply use the files that are "on" the PAN card. When the user leaves the computer, the icon disappears. When the user sits down at the second computer, the same files are available there. The data is actually stored and managed on a server 104 by the Informative Things 110 system (with appropriate caching at the machine where the data is currently being used). But for all appearances, the user carries the data in his or her wallet.

Consider a more futuristic scenario in which information appliances such as viewboards are commonplace [see, e.g., reference #10]. Users keep these simple interactive screens on their desks, carrying them around as needed to work with information. When enabled with Informative Things 110, a viewboard can be "connected" to a Thing 110 and then the data attached to the Thing 110 can be used. For example, a binder that once held paper copies of protocol specifications would simply have a barcode printed on it. When the barcode is scanned by the viewboard, its Thing ID is used to access the relevant specifications from the network 100. This physical-virtual notebook has some of the advantages of physical object (e.g., can be carried from place to place) and some advantages of a virtual object (e.g., seemingly limitless capacity).

By relaxing the constraint that only the holder of a Thing 110 can modify its contents, we can envision a scenario involving an salesperson who needs an up-to-date sales presentation. By giving the salesperson an appropriate Informative Thing 110, he or she can always access the most recent version of the presentation while someone at the home office manages the versions. IN fact, previous versions can also be maintained on the Thing 110 so that new versions are never a surprise. This scenario raises issues of low bandwidth and sporadic connectivity, which can obviously limit the utility of Informative Things 110.

As a final example, we can imagine aiding navigation through physical spaces. Rather than telling a hospital patient to follow a red line to a green line to the radiology lab, the patient can be handed an Informative Thing 110 that "knows" the pathway and destination. As the patient passes hallway monitors, they display appropriate directions. Alternatively, the situation could be reversed so that the hallway contains Informative Things 110 and the patient carries an information appliance that know the destination. The hallway Things 110 tell the appliance where the patient is and the appliance tells the patient the appropriate directions.

These examples are simply starting points for exploiting the idea of Informative Things 100. The concept provides the capability of attaching data to physical objects. which can be easily transported, remembered, shared, and organized. Though information is not actually stored "on" the object, the system provides the appearance that it is.

What Problems are Solved?

The Informative Things 110 system provides both a new conceptualization of managing networked information and also solutions to problems faced by real users. In this section, we discuss some of these problems and their solutions.

Namespace Resolution through Physical Objects

The networked computing environment promises "everything accessible by everyone, everywhere." AS we near this goal, the utility of universal connectivity is obvious. But a significant problem is that this environment requires a global namespace. One reason for the success of the world-wide web is that it helps to simplify the collection of hundreds of millions of URLs. Most pages of interest lie within several clicks of an easily remembered page, such as http://www.yahoo.com. The namespace is collapsed because pages can be reached by a relatively simple name and several mouse clicks. With Informative Things 110, we have collapsed the global namespace by connecting subspaces with physical objects. Though this method has intuitive appeal, computationally speaking, it does not provide more power than already exists. That is, in the networked world, any information can be accessed, but Informative Things 110 restricts access: The user can only access information attached to a physical object. AS we have demonstrated, by narrowing the namespace, this restriction facilitates some aspects of information management.

Information Migration to Shared Network Servers

The following sort of conversation occurs quite often among members of our group:

A: Could you send me that file?
B: Should I mail it or should I put it on my ftp server?
A: Could you put it on the Unix server?
B: My password just expired. I'll put it on the web.
A: Great. What is the URL?
B: I'll make it "http://w3/~barrett/temp/myfile.txt".
A: Do you spell "barrett" with one "t" or two?

This unfortunately realistic example points out that the networked world is quite complicated when it comes to spontaneously sharing information. A sharing mechanism must be decided upon, which often requires some level of negotiation. the information exporter must decide how to name the new resource and must then figure out how to transfer it. Finally, the global name must be successfully communicated to the information receiver.

Informative Things 110 simplifies this by hiding the mechanism, naming, data transfer, and communication of the name. The exporter simply grabs a Thing 110, attaches information to it, and then hands it to the receiver. Furthermore, the range concept (which specifies Local, Intranet or Internet) provides a useful granularity for deciding what type of service to use for information storage.

Permissions

Managing permissions in distributed systems is complex. The most common models involve access control lists, group membership, and user ID/password management. Because of the difficulty of successfully using these affordances, most users make data either accessible to only the author or accessible to the entire world. More complete permissions models result in significant headaches for the system administrators.

In the Informative Things 110 approach, permission to access information is governed by possession of a physical object. This method corresponds to real-world security. Admittedly, this approach is inappropriate for geographically disparate users or for large numbers of users. However, as we have seen, there are many common shared data scenarios in which governing permission by physical possession is both adequate and useful.

Open Questions and Future Work

Informative Things 110 simplifies some kinds of data transfer. But we have not yet confronted all questions raised by this approach. In this section, we briefly discuss some additional issues.

Universal Connectivity

Throughout the discussion we have assumed universal, high-speed network 100 connectivity. Although network 100 technology is advancing rapidly, universal access has not yet arrived. Nevertheless, because many locations, such as universities and corporate offices, have sufficient connectivity, Informative Things 110 is quite practical today in these settings. Further work on such technologies as replication, prefetching, and caching would make Informative Things 110 applicable to a broad range of "sometimes connected" or low-speed connected users. For example, a user who occasionally connects via modem cannot assume that information attached to Things 110 will always be accessible. Rather, a method for indicating which information is to be replicated to the local computer must be devised.

Dynamic Information

In our current model, one set of information is attached to each Thing 110. However, it might be useful to have different sets of information attached to a single Thing 110 depending upon who is viewing it. For example, consider attaching annotations to books. If all users see all annotations on a book, it would be like getting a book from the library that has been highlighted and marked up. Rather, we suggest that much of the time, different people would prefer to see only their own annotations attached to a book.

In other circumstances, one might want control of the information attached to an object while another is in possession of it. Again, this breaks our original model. One application of this would a floppy disk that always contains the latest operating system revision and drivers for a Thinkpad 760ED laptop computer, enabling the computer owner to always have pointers to the most recent software and to always be able to find the software simply by finding the physical floppy disk. However, because the "contents" of the disk can change while it is in the user' physical possession, this application does not fit our metaphor. Another example along these lines is the always up-to-date sales presentation discussed previously.

Ubiquity

A recurring problem in cooperative computing systems is that the enabling software must be present on all of the computers used by the cooperating parties. If one user hands another a file on a Thing 110, both users must have the base software installed on their machine, or else they cannot share the file in this way. This problem can be solved by using a floppy disk as the Thing 110. Because the floppy disk can contain arbitrary data as well as a Thing ID, we can put a copy of the enabling software on the floppy. So when one user gives another a floppy disk, it contains everything needed to access the file. The most attractive solution would be for the floppy to contain an HTML page and a Java applet that could be loaded by a browser and then automatically install itself on the host computer.

Loosening Constraints

Current computer networks 100 allow users to (a) transfer data through a multitude of mechanisms and protocols, (b) store the data on shared devices, and (c protect the data from improper access. The Informative Things 110 concept takes this extremely flexible environment and constrains it to increase usability. By requiring possession of a physical object to access data, the user's power is decreased. As we work with the system, we find that it is always tempting to loosen these self-imposed constraints. For example, to allow the attached data to be modified by someone who does not possess the object (as described previously), or to allow users to hold on to Thing IDs for objects that they no longer possess. Similarly, we are tempted to allow more elaborate permissions schemes to handle particular security situations. But care must be exercised, because these loosened constraints quickly devolve back into the ordinary networked information model. Imposing the physical object limitation provides enhanced usability and should not be circumvented for temporary convenience.

In summary, we have illustrated herein the concept of "Informative Things", a new user interface model that simplifies many aspects of data transfer among physically close individuals. In standard networked computer environments, countless low-level decisions often stand in the way of productive computer use. For instance, to simply give a file away, a user must find an appropriate storage location, name the file, select a transport mechanism, and set appropriate access permissions. From the user's perspective, such details are often irrelevant. By combining both the promise of universal connectivity and the fact that people normally interact with physical objects, Informative Things moves information from the virtual world to the physical world, transforming ordinary physical actions (e.g., walking from place to place) into information actions (e.g., copying data from one computer to another). In the process, our approach eliminates mundane problems of data transfer and opens up new possibilities for physical information interfaces.

References

The following references are cited herein by reference number (i.e., [x] where x is the reference number):

1. Adler, S. et al., *A Proposal for XSL,* Microsoft Corporation, 1997. Available as: http://www.w3. org. TR/NOTE-XSL.html.
2. Bray, T., Paoli, J., and Sperberg-McQueen, C. M., *Extensible Markup Language (XML)* 1.0., W3C Recommendation, Word Wide Web Consortium, 1998. Available as http://www.w3.org/TR/1998/REC-xml-19980210.html.
3. Dieberger, A., *A city metaphor to support navigation in complex information spaces,* in Hirtle, S. C., and Frank, A. U. (Eds.), *Spatial information theory: A theoretical basis for GIS,* COSIT '97, Springer-Verlag, Berlin, 1997.
4. Fielding, R., Gettys, J., Mogul, J. C., Frystyk, H., Masinter, L., Leach, P., and Berners-Lee, T., *Hypertext Transfer Protocol-HTTP*/1.1., World Wide Web Consortium, 1998. Available as http://www.w3.org./ Protocols/HTTP/1.1/draft-ietf-http-v11-spec-rev-03.text.
5. Freier, A. O., Karlton, P., and Kocher, P. C., *The SSL Protocol,* Netscape Corporation, 1996. Available as ftp:// ietf.org/internnet-drafts/draft-fraiser-ssl-version3.01.text.
6. Leach, P. J., and Naik, D. C., *A Common Internet File System* (CIFS/1.0) *Protocol,* Microsoft Corporation, 1997. Available as ftp://ietf.org/internnet-drafts/draft-leach-cifs-v1-spec-01.txt.
7. Maglio, P. P., and Barrett, R., *On the trail of information searchers,* Proceedings of the Nineteenth Annual Conference of the Cognitive Science Society (Stanford University, Palo Alto, Calif.), LEA, Mahwah, N.J., 1997, pp. 466–471.
8. Maglio, P. P., and Matlock T., *Metaphors we surf the web by,* Workshop on Personalized and Social Navigation in Information Space, Stockholem, Sweden, 1998.
9. Mander, R., Salomon, G., and Wong, Y. Y., *A "pile" metaphor for supporting casual organization of information,* Proceedings of the ACM Conference on Human Factors in Computing Systems, CHI '92, ACM Press, New York, 1992.
10. Selker, T. and Allison, J., *Room with a view,* Proceedings of Computer Supported Cooperative Work '96, Boston, Mass., 1996.
11. Vicente, K. J. and Williges, R. C., *Accommodating individual differences in searching a hierarchical file system,* International Journal of Man-Machine Studies, 29, pp. 647–668, 1998.
12. Waterworth, J. A., *Personal spaces: 3D spatial words for information exploration, organization and communication,* in Earnshaw, R., and J. Vince (Eds.), *The Internet in 3D: Information, images, and interaction,* Academic Press, San Diego, 1997.
13. Wellner, P., Mackay, W., and Gold, R., *Computer-augmented environments: Back to the real world,* Special issue of Communications of the ACM, 36, 1993.
14. Zimmerman, T., *Personal Area Networks: Near-field intrabody communications,* IBM Systems Journal, 35, 1996
15. Ishii, H., and Ullmer, B., *Tangible Bits: Towards Seamless Interfaces between People, Bits, and Atoms,* ACM Computer-Human Interaction SIGCHI '97, Atlanta, Ga., pp. 234–241, 1997.

All of the above references are incorporated by reference herein.

Logic of Informative Things

Figure 3:
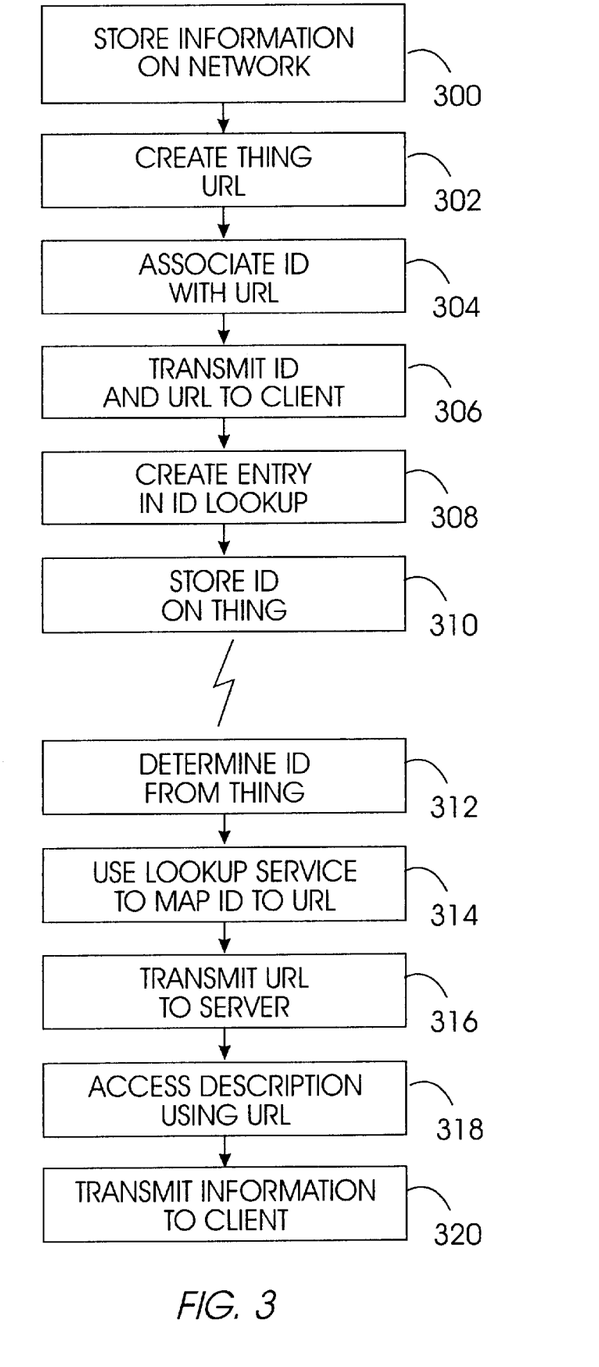
FIG. 3 is a flowchart illustrating the logic performed when using Informative Things according to the present invention.

FIG. 3 is a flowchart illustrating the logic performed when using Informative Things according to the present invention. Of course, those skilled in the art will recognize that other logic may be used without departing from the scope of the present invention.

Block 300 represents the server computer 104 storing information to be associated with an Informative Thing 110 within a Thing Description at a specified location in the network-based system.

Block 302 represents the server computer 104 creating a Thing URL to identify the location of the Thing Description.

Block 304 represents the server computer 104 associating the Thing URL that identifies the location of the Thing Description with a Thing ID.

Block 306 represents the server computer 104 transmitting the Thing ID and the Thing URL to the client computer 102.

Block 308 represents the client computer 102 creating an entry in the ID Lookup Service 112 that maps the Thing ID to the Thing URL.

Block 310 represents the client computer 102 storing the Thing ID on the Informative Thing 110.

At some point thereafter, the person in possession of the Informative Thing 110 interfaces it to the same or a different client computer 102.

Block 312 represents the client computer 102 interfacing to the Informative Thing 110 to determine a Thing ID stored thereon.

Block 314 represents the client computer 102 mapping the Thing ID to a Thing URL using the ID Lookup Service 112.

Block 316 represents the client computer 102 transmitting the Thing URL to the server computer 104.

Block 318 represents the server computer 104 using the Thing URL to access a Thing Description containing the information associated with the Informative Thing 110.

Finally, Block 320 represents the server computer 104 transmitting the information associated with the Informative Thing 110 to the client computer 102.

Conclusion

This concludes the description of the preferred embodiment of the invention. The following describes some alternative embodiments for accomplishing the present invention.

For example, those skilled in the art will recognize that any type of computer configuration and/or network configuration could benefit from the present invention. Those skilled in the art will also recognize that many types of computer programs could be used with the present invention, in addition to those enumerated herein. In addition, those skilled in the art will also recognize that many types of Informative Things and Thing IDs could be used in the present invention.

In summary, the present invention discloses a method, apparatus, and article of manufacture for managing information through the use of physical objects, a method, apparatus, and article of manufacture for managing information through the use of physical objects. An Informative Thing that is a physical object stores a pointer to the desired information. Upon interfacing to a network-based system, the pointer is retrieved and then used to retrieve the desired information associated with the Informative Thing from a network-based system.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A network-based system for information management, comprising:
   (a) an independently portable physical object that is a data storage device (referred to as an Informative Thing), wherein:
      (i) the Informative Thing has an ID (referred to as a Thing ID) that represents an identity of the Informative Thing; and
      (ii) the Thing ID is associated with information stored at an information store separate from the Informative Thing;
   (b) a client computer that is configured to:
      (i) read the Thing ID from the Informative Thing;
      (ii) determine a location for where the information is stored based on the Thing ID; and
      (iii) request and receive the information; and
   (c) a server computer, connected to the client computer, that is configured to:
      (i) retrieve information pursuant to the request of the client computer from the information store; and
      (ii) transmit the information to the client computer.

2. The network-based system of claim 1 above, wherein the Thing ID comprises a pointer to the information.

3. The network-based system of claim 1, wherein the Informative Thing actively broadcasts its Thing ID.

4. The network-based system of claim 3, wherein the Thing ID varies with time.

5. The network-based system of claim 3, wherein the Informative Thing includes a personal area network transmitter.

6. The network-based system of claim 1, wherein the Thing ID is passively read by the client computer.

7. The network-based system of claim 1, wherein the Thing ID is automatically generated when the Informative Thing is first accessed by the client computer.

8. The network-based system of claim 1, wherein the Thing ID is a combination of a volume label and serial number.

9. The network-based system of claim 1, wherein the Thing ID is a combination of a timestamp, device ID, and random number.

10. The network-based system of claim 1, wherein the client computer maps the Thing ID into a pointer and the server computer uses the pointer to retrieve the information associated with the Informative Thing.

11. The network-based system of claim 1, wherein the client computer maps the Thing ID to a Thing Universal Resource Location (URL), wherein the Thing URL comprises a URL for a location of the Informative Thing, and the server computer uses the Thing URL to retrieve a Thing Description, wherein the Thing Description contains the information associated with the Informative Thing.

12. The network-based system of claim 11, wherein the client computer is further configured to use an ID Lookup Service to determine the Thing URL from the Thing ID.

13. The network-based system of claim 12, wherein the ID Lookup Service is a centralized server.

14. The network-based system of claim 12, wherein the ID Lookup Service is a distributed system.

15. The network-based system of claim 11, wherein the Thing URL and the information associated with the Informative Thing are stored on separate server computers.

16. The network-based system of claim 11, wherein the Thing Description contains a list of URLs, which in turn point to the information associated with the Informative Thing.

17. The network-based system of claim 11, wherein the Thing Description is an Extensible Markup Language (XML) document.

18. The network-based system of claim 11, wherein the information associated with the Informative thing is created by storing data to a location in the network-based system, creating a Thing URL to identify the location of the stored data, and associating the Thing URL with a Thing ID.

19. The network-based system of claim 11, wherein the information associated with the Informative Thing is copied by transfecting it to a new location in the network-based system and updating the Thing Description to reflect the new location.

20. The network-based system of claim 11, wherein the client computer modifies the information by reading its original contents, making changes thereto, and then re-storing the information.

21. The network-based system of claim 11, wherein only a person in possession of the Informative Thing can access the information associated with the Informative Thing.

22. The network-based system of claim 11, wherein only a person in possession of the Informative Thing can modify the information associated with the Informative Thing.

23. The network-based system of claim 1, wherein the client computer chooses its own rendering of the retrieved information.

24. The network-based system of claim 1, wherein the client computer exports the retrieved information.

25. The network-based system of claim 1, wherein the server computer is selected from a group comprising a local server, an Internet server, and an Internet server.

26. The network-based system of claim 1, wherein a plurality of Informative Things store the same Thing ID.

27. The network-based system of claim 1, wherein a plurality of different information sets are associated with the Informative Thing and access to one or more of the different information sets is dependent upon who is in possession of the Informative Thing.

28. A method of information management in a network-based system, comprising the steps of:
   (a) reading an ID (referred to as a Thing ID) from an independently portable physical object that is a data storage device (referred to as an Informative Thing), wherein:

(i) the Thing ID represents an identity of the Informative Thing; and (ii) the Thing ID is associated with information stored at an information store separate from the Informative Thing;

(b) determining a location for where the information is stored based on the Thing ID; and (c) retrieving the information associated with the Informative Thing from the network-based system using the Thing ID.

29. The method of information management of claim 28, wherein the Thing ID comprises a pointer to the information.

30. The method of information management of claim 28, wherein the Informative Thing actively broadcasts its Thing ID.

31. The method of information management of claim 30, wherein the Thing ID varies with time.

32. The method of information management of claim 30, wherein the Informative Thing includes a personal area network transmitter.

33. The method of information management of claim 28, wherein the Thing ID is passively read by a computer.

34. The method of information management of claim 28, wherein the Thing ID is automatically generated when the data storage device is first accessed by a computer.

35. The method of information management of claim 28, wherein the Thing ID is a combination of a volume label and serial number.

36. The method of information management of claim 28, wherein the Thing ID is a combination of a timestamp, device ID, and random number.

37. The method of information management of claim 28, further comprising the steps of mapping the Thing ID into a pointer and using the pointer to retrieve the information associated with the Informative Thing.

38. The method of information management of claim 28, further comprising the steps of mapping the Thing ID to a Thing Universal Resource Location (URL), wherein the Thing URL comprises a URL for the location of the Informative Thing, and using the Thing URL to retrieve a Thing Description, wherein the Thing Description contains the information associated with the Informative Thing.

39. The method of information management of claim 28, wherein the mapping step comprises the steps of determining the Thing ID of the Informative Thing and then using an ID Lookup Service to determine the Thing URL from the Thing ID.

40. The method of information management of claim 39, wherein the ID Lookup Service is a centralized server.

41. The method of information management of claim 39, wherein the ID Lookup Service is a distributed system.

42. The method of information management of claim 38, wherein the Thing URL and the information associated with the Informative Thing are stored on separate computers.

43. The method of information management of claim 38, wherein the Thing Description contains a list of URLs, which in turn point to the information associated with the Informative Thing.

44. The method of information management of claim 38, wherein the Thing Description is an Extensible Markup Language (XML) document.

45. The method of information management of claim 38, wherein the information associated with the Informative Thing is created by storing data to a location in the network-based system, creating a Thing URL to identify the location of the stored data, and associating the Thing URL with a Thing ID.

46. The method of information management of claim 38, wherein the information associated with the Informative Thing is copied by transferring it to a new location in the network-based system and updating the Thing Description to reflect the new location.

47. The method of information management of claim 38, wherein a computer modifies the information by readings its original contents, making changes thereto, and then re-storing the information.

48. The method of information management of claim 38, wherein only a person in possession of the Informative Thing can access the information associated with the Informative Thing.

49. The method of information management of claim 38, wherein only a person in possession of the Informative Thing can modify the information associated with the Informative Thing.

50. The method of information management of claim 28, wherein a computer chooses its own rendering of the retrieved information.

51. The method of information management of claim 28, wherein a computer exports the retrieved information.

52. The method of information management of claim 28, wherein the network-based system includes a server computer selected from a group comprising a local server, an Internet server, and an Internet server.

53. The method of information management of claim 28, wherein a plurality of Informative Things store the same Thing ID.

54. The method of information management of claim 28, wherein a plurality of different information sets are associated with the Informative Thing and access to one or more of the different information sets is dependent upon who is in possession of the Informative Thing.

55. An article of manufacture comprising an independently portable physical object that is a data storage device (referred to as an Informative Thing), wherein:

(a) the Informative Thing stores and ID (referred to as a Thing ID), thereon, wherein the Thing ID represents an identity of the Informative Thing;

(b) the Thing ID is associated with information stored at an information store separate from the Informative Thing on a network-based system; and (c) the Thing ID is used to determine a location for where the information is stored and retrieve the information associated with the Informative Thing from the information store.

56. The article of manufacture of claim 55, wherein the Thing ID comprises a pointer.

57. The article of manufacture of claim 55, wherein the Informative Thing actively broadcasts its Thing ID.

58. The article of manufacture of claim 57, wherein the Thing ID varies with time.

59. The article of manufacture of claim 57, wherein the Informative Thing includes a personal area network transmitter.

60. The article of manufacture of claim 55, wherein the Thing ID is passively read by a computer.

61. The article of manufacture of claim 55, wherein the Thing ID is automatically generated when the Informative Thing is first accessed by a computer.

62. The article of manufacture of claim 55, wherein the Thing ID is a combination of a volume label and serial number.

63. The article of manufacture of claim 55, wherein the Thing ID is a combination of a timestamp, device ID, and random number.

64. The article of manufacture of claim 55, wherein a first computer maps the Thing ID into a pointer and a second computer uses the pointer to retrieve the information associated with the Informative Thing.

65. The article of manufacture of claim 55, wherein a first computer maps the Thing ID to a Thing Universal Resource Location (URL), wherein the Thing URL comprises a URL for the location of the Informative Thing, and a second computer uses the Thing URL to retrieve a Thing Description, wherein the Thing Description contains the information associated with the Informative Thing.

66. The article of manufacture of claim 65, wherein the first computer determines the Thing ID of the Informative Thing and then uses an ID Lookup Service to determine the Thing URL from the Thing ID.

67. The article of manufacture of claim 66, wherein the ID Lookup Service is a centralized server.

68. The article of manufacture of claim 66, wherein the ID Lookup Service is a distributed system.

69. The article of manufacture of claim 65, wherein the Thing URL and the information associated with the Informative Thing are stored on separate computers.

70. The article of manufacture of claim 65, wherein the Thing Description contains a list of URLs, which in turn point to the information associated with the Informative Thing.

71. The article of manufacture of claim 65, wherein the Thing Description is an Extensible Markup Language (XML) document.

72. The article of manufacture of claim 65, wherein the information associated with the Informative Thing is crated by storing data to a location in the network-based system, creating a Thing URL to identify the stored data, and associating the Thing URL with a Thing ID.

73. The article of manufacture of claim 65, wherein the information associated with the Informative Thing is copied by transferring it to a new location in the network-based system and updating the Thing Description to reflect the new location.

74. The article of manufacture of claim 63, wherein a computer modifies the information by reading its original contents, making changes thereto, and then re-storing the information.

75. The article of manufacture of claim 65, wherein only a person in possession of the Informative Thing can access the information associated with the Informative Thing.

76. The article of manufacture of claim 65, wherein only a person in possession of the Informative Thing can modify the information associated with the Informative Thing.

77. The article of manufacture of claim 55, wherein a computer chooses its own rendering of the retrieved information.

78. The article of manufacture of claim 55, wherein a computer exports the retrieved information.

79. The article of manufacture of claim 55, wherein a plurality of Informative Things store the same Thing ID.

80. The article of manufacture of claim 55, wherein a plurality of different information sets are associated with the Informative Thing and access to one or more of the different information sets is dependent upon who is in possession of the Informative Thing.

* * * * *